(12) United States Patent
Ekkizogloy et al.

(10) Patent No.: US 7,295,750 B2
(45) Date of Patent: Nov. 13, 2007

(54) ACCESS KEY ENABLED UPDATE OF AN OPTICAL TRANSCEIVER

(75) Inventors: Luke M. Ekkizogloy, San Jose, CA (US); Gerald L. Dybsetter, Scotts Valley, CA (US); Jayne C. Hahin, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/320,180

(22) Filed: Dec. 28, 2005

(65) Prior Publication Data

US 2006/0147178 A1    Jul. 6, 2006

Related U.S. Application Data

(60) Provisional application No. 60/640,621, filed on Dec. 30, 2004.

(51) Int. Cl.
*G02B 6/00* (2006.01)
(52) U.S. Cl. .................. 385/147; 398/135; 398/137
(58) Field of Classification Search ............... 385/147; 398/135–139, 140, 164
See application file for complete search history.

(56) References Cited

U.S. PATENT DOCUMENTS

| | | | |
|---|---|---|---|
| 4,905,301 A * | 2/1990 | Krolopp et al. ............. | 455/434 |
| 6,643,843 B1 * | 11/2003 | Reger ........................ | 717/168 |
| 6,957,021 B2 * | 10/2005 | Aronson et al. ............ | 398/137 |
| 7,079,775 B2 | 7/2006 | Aronson et al. | |
| 2002/0149821 A1 | 10/2002 | Aronson et al. | |
| 2004/0022537 A1 | 2/2004 | Mecherle et al. ............ | 398/41 |
| 2004/0100687 A1 | 5/2004 | Aronson et al. | |

* cited by examiner

*Primary Examiner*—Hemang Sanghavi
*Assistant Examiner*—Kajli Prince
(74) *Attorney, Agent, or Firm*—Workman Nydegger

(57) ABSTRACT

Systems and methods for verifying that an optical transceiver has access privileges to received microcode. An example environment may include an optical transceiver that is coupled to a host computing system. The optical transceiver includes a memory that has thereon an optical transceiver access identifier. The optical transceiver memory is also configured to receive microcode that includes a microcode access identifier. Whenever new microcode is received by the optical transceiver, it is verified whether the optical transceiver should have access privileges to the microcode. To verify that the optical transceiver has access privileges, the optical transceiver access identifier and the microcode access identifier are accessed. The accessed identifiers are then compared with one another. Based on the comparison, the received microcode is loaded into the memory if one or more portions of the access identifiers match.

19 Claims, 3 Drawing Sheets

ACCESS KEY ENABLED UPDATE OF AN OPTICAL TRANSCEIVER

CROSS-REFERENCE TO RELATED APPLICATIONS

This application claims the benefit of U.S. Provisional Application No. 60/640,621, filed Dec. 30, 2004, which is incorporated herein by reference in its entirety.

BACKGROUND OF THE INVENTION

1. The Field of the Invention

The present invention relates generally to optical transceivers, transmitters and receivers. More specifically, the present invention relates to optical transceivers that include a microcode access key for use in the loading of different versions of microcode that manage transceiver operation.

2. Background and Relevant Art

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed through it, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser) configured to control the operation of the optical transmitter in response to various control inputs. The optical transceiver also generally includes an amplifier (e.g., often referred to as a "post-amplifier") configured to amplify the channel-attenuated received signal prior to further processing. A controller circuit (hereinafter referred to the "controller") controls the operation of the laser driver and post-amplifier.

Controllers are typically implemented in hardware as state machines. Their operation is fast, but inflexible. Being primarily state machines, the functionality of the controller is limited to the hardware structure of the controller. What would be advantageous are controllers that have more flexible functionality.

BRIEF SUMMARY OF THE INVENTION

The foregoing problems with the prior state of the art are overcome by the principles of the present invention, which relate to an environment that includes an optical transceiver that is coupled to a host computing system. The optical transceiver includes a memory that has thereon an optical transceiver access identifier. The optical transceiver memory is also configured to receive microcode that includes a microcode access identifier.

Whenever new microcode is received by the optical transceiver, it is verified whether the optical transceiver should have access privileges to the microcode. To verify that the optical transceiver has access privileges, the optical transceiver access identifier and the microcode access identifier are accessed. The accessed identifiers are then compared with one another. Based on the comparison, the received microcode is loaded into the memory if one or more portions of the access identifiers match.

Accordingly, the principles of the present invention allow for an access key to be utilized when new microcode is received by an optical transceiver. The access key helps to ensure that improper microcode is not loaded or executed by the optical transceiver, thus helping to protect the optical transceiver from operational failure or damage to transceiver hardware components.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The principles of the present invention relate systems and methods for verifying that an optical transceiver (or receiver) has access privileges to received microcode. An example environment may include an optical transceiver that is coupled to a host computing system. The optical transceiver includes a memory that has thereon an optical transceiver access identifier. The optical transceiver memory is also configured to receive microcode that includes a microcode access identifier.

Whenever new microcode is received by the optical transceiver, it is verified whether the optical transceiver should have access privileges to the microcode. To verify that the optical transceiver has access privileges, the optical transceiver access identifier and the microcode access identifier are accessed. The accessed identifiers are then compared with one another. Based on the comparison, the received microcode is loaded into the memory if one or more portions of the access identifiers match. An example operational optical transceiver environment will first be described. Then, the operation in accordance with the invention will be described with respect to the operational environment.

Figure 1:
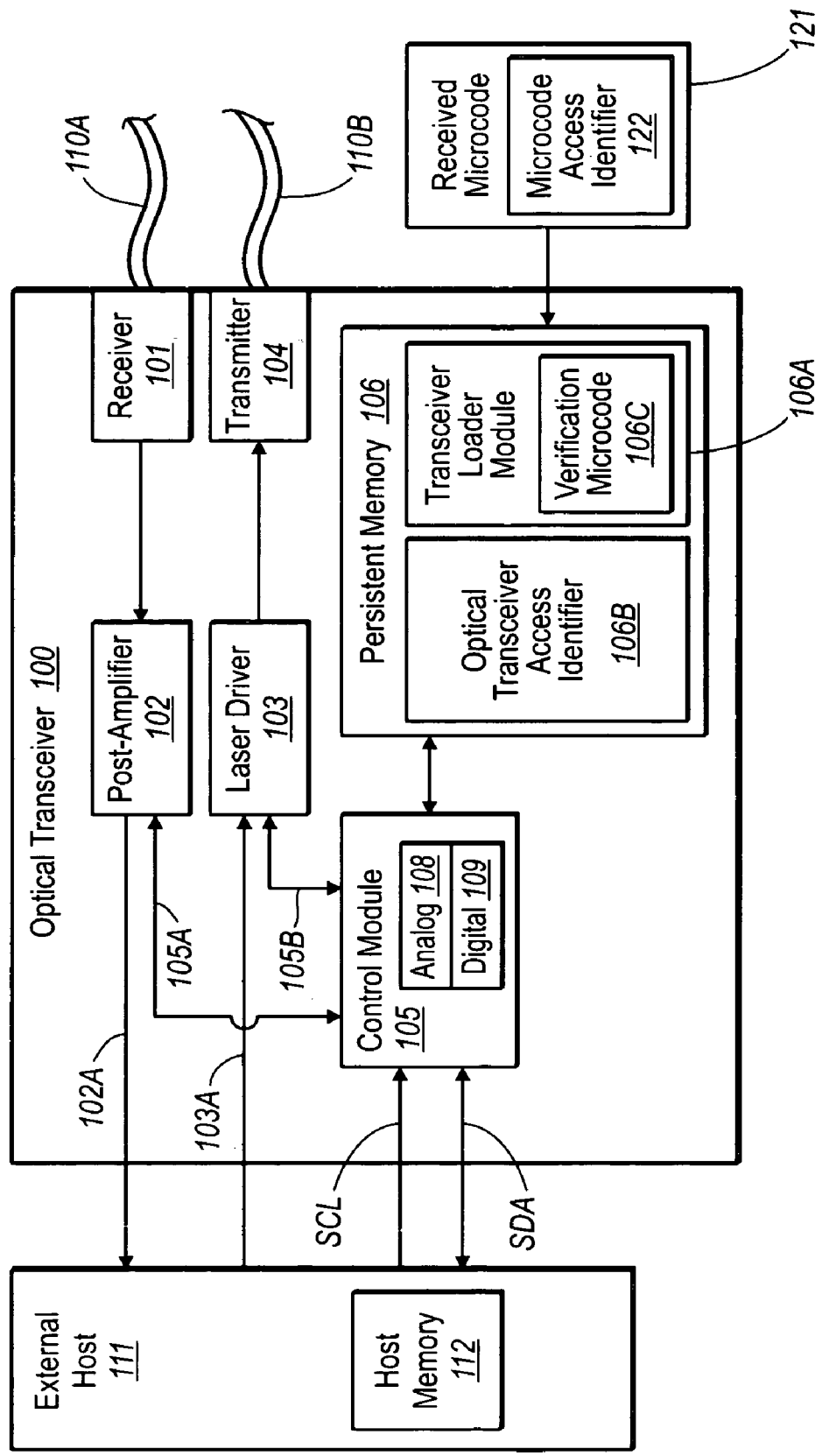
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention are suitable for 1G, 2G, 4G, 8G, 10G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

The optical transceiver 100 receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host 111 as represented by arrow 102A. The external host 111 may be any computing system capable of communicating with and/or providing microcode to the optical transceiver 100. The external host 111 may contain a host memory 112 that may be a volatile or non-volatile memory source. In one embodiment, the optical transceiver 100 may be a printed circuit board or other components/chips within the host 111, although this is not required.

The optical transceiver 100 may also receive electrical signals from the host 111 for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 110B optical signals representative of the information in the electrical signal provided by the host 111. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transceiver 100 includes a control module 105, which may evaluate temperature and voltage conditions and other operational circumstances, and receive information from the post-amplifier 102 (as represented by arrow 105A) and from the laser driver 103 (as represented by arrow 105B). This allows the control module 105 to optimize the dynamically varying performance, and additionally detect when there is a loss of signal.

Specifically, the control module 105 may counteract these changes by adjusting settings on the post-amplifier 102 and/or the laser driver 103 as also represented by the arrows 105A and 105B. These settings adjustments are quite intermittent since they are only made when temperature or voltage or other low frequency changes so warrant. Receive power is an example of such a low frequency change.

The control module 105 may have access to a persistent memory 106, which in one embodiment, is an Electrically Erasable and Programmable Read Only Memory (EEPROM). The persistent memory 106 and the control module 105 may be packaged together in the same package or in different packages without restriction. Persistent memory 106 may also be any other non-volatile memory source.

Figure 2:
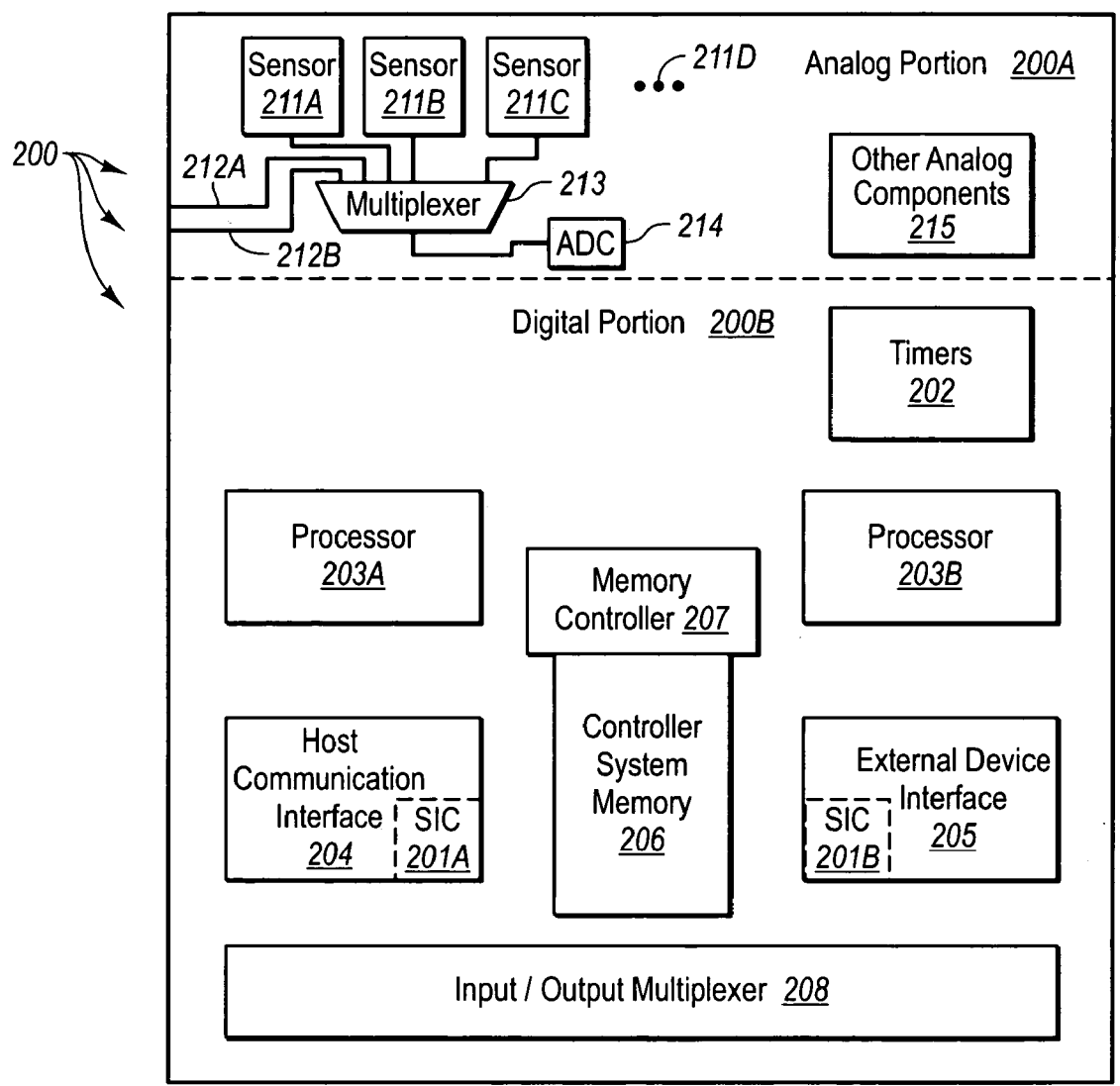
FIG. 2 schematically illustrates an example of a control module of FIG. 1.

The control module 105 includes both an analog portion 108 and a digital portion 109. Together, they allow the control module to implement logic digitally, while still largely interfacing with the rest of the optical transceiver 100 using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components. The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111 possibly implemented using a two-wire interface such as I²C shown in FIG. 1 as the serial data (SDA) and serial clock (SCL) lines on the optical transceiver 100. Other host communication interfaces may also be implemented as well. Data may be provided from the control module 105 to the host 111 using this host communications interface to allow for digital diagnostics and readings of temperature levels, transmit/receiver power levels, and the like. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I²C or may be another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input\output nodes within the control module 200 than there are pins available on the control module 200, thereby reducing the footprint of the control module 200.

Having described a specific environment with respect to FIGS. 1 and 2, it will be understood that this specific environment is only one of countless architectures in which the principles of the present invention may be employed. As previously stated, the principles of the present invention are not intended to be limited to any particular environment. Accordingly, the principles of the present invention relate to systems and methods that verify that an optical transceiver has access privileges to microcode received from the host computing system or other sources. The principles of the present invention will be discussed with reference to the environment described in relation to FIGS. 1 and 2.

During the normal operation of an optical transceiver, it often times becomes desirable to update the microcode that controls the operation of the transceiver. In the description and in the claims "microcode" is defined to include, but is not limited to, firmware, software, or any other type of executable instructions that may control the operation of the optical transceiver. The update microcode may be provided by a variety of sources, such as host 111. However, there is often a risk that improper microcode may be provided to the optical transceiver. Executing the improper microcode may cause operational failure or damage to the transceiver. The principles of the present invention provide for verification that the microcode about to be loaded into the optical transceiver is of a proper type, thus helping to protect the optical transceiver.

During manufacture of optical transceiver 100, a transceiver 100 manufacturer may desire to include an optical transceiver access identifier 106B. In some embodiments, the optical transceiver access identifier 106B may be added to the optical transceiver after manufacture. The optical transceiver access identifier 106B may be stored in persistent memory 106 or some other accessible memory location. The optical transceiver access identifier 106B may include specific information about transceiver 100 that may later be used help verify that transceiver 100 has access privileges to received microcode.

For example, the optical transceiver access identifier 106B may include a serial number, part number, model number, lot number, module family, current firmware version, PCBA number, the date manufactured, customer name, customer part number, protocol and speed, etc. Note that this list is included for illustrative purposes only and is not meant to limit the scope of the claims in any way. It will be appreciated that the optical transceiver access identifier 106B may include any number of additional information about an optical transceiver module. Also note that the list of optical transceiver access identifiers is not exclusive as an optical transceiver may have an access identifier that includes all of the listed information or any desirable subset of the list.

A user may desire to receive new microcode that controls the function of the optical transceiver 100 and that may be stored in persistent memory 106 for later execution. The new microcode, which is illustrated in FIG. 1 as received microcode 121, may be from a library of microcode stored in host memory 112. Alternatively, host 111 may be connected to a wide area network such as the Internet and may be able to access the new microcode 121 from a remote data site such as a World Wide Web page configured to allow user selection of desired microcode. The microcode 121 may be from any number of other sources.

To ensure that an optical transceiver, such as optical transceiver 100, which will receive microcode 121 has access privileges to the microcode, received microcode 121 may include a microcode access identifier 122. The microcode access identifier 122 may be configured to include any number of information about the optical transceivers that should have access privileges to received microcode 121. For example, microcode access identifier 122 may include a serial number, part number, model number, lot number, module family, current firmware version, PCBA number, the date manufactured, customer name, customer part number, etc. As noted above, this list is for illustration only and is neither exhaustive nor exclusive.

In some embodiments, optical transceiver 100 may include a transceiver loader module 106A. The transceiver loader module 106A may include one or more write-protected memory locations located in persistent memory 106. The transceiver loader module 106A may further include verification microcode 106C, which includes executable instructions that, when executed by processors 203, may cause the optical transceiver 100 to use both the optical transceiver access identifier and the microcode access identifier when verifying access privileges to the received microcode 121.

In one embodiment, transceiver 100 may receive microcode 121 from host 111. As mentioned, transceiver 100 may include an optical transceiver access identifier 106B. Also, the received microcode 121 may include the microcode access identifier 122. In order to verify that it has access privileges to received microcode 121, optical transceiver 100, specifically processors 203, may access transceiver access identifier 106B and microcode access identifier 122. For example, both access identifiers may include the serial number of transceiver 100.

The processors 203 may then compare the transceiver access identifier with the microcode access identifier. In embodiments employing a transceiver loader module 106A, the verification microcode 106C may cause the processors 203 to perform the comparison of the access identifiers 106B and 122. If the access identifiers 106B and 122 include matching data, then microcode 121 may be loaded by processors 203 into transceiver 100 memory for execution. On the other hand, if the access identifiers 106B and 122 do not include matching data, then the microcode 121 is not loaded by the processors 203 into transceiver 100 memory for execution. The microcode is simply ignored by the transceiver 100.

For example, as mentioned above, since both transceiver access identifier 106B and microcode access identifier 122 include the serial number of optical transceiver 100, a match will be found and microcode 121 may be loaded to memory of optical transceiver 100. Microcode 121 may be loaded into controller system memory 206 for immediate execution. Alternatively, it may be loaded into persistent memory 106 for later execution.

In an alternative embodiment, host 111 may receive microcode 121 and may verify that optical transceiver 100 has access privileges to the microcode before providing the microcode to transceiver 100. In this case, host 111 may access transceiver access identifier 106B from transceiver 100 over the implemented host communication interface. In addition, the host may access microcode access identifier 122. The host 111 may then compare the two access identifiers 106B and 122 to ascertain if any data matches in the manner previously described. If there is a match, the host 111 will provide the microcode 121 to transceiver 100 where it may be executed. If there is no match, then the host simply does not provide the microcode 121 to optical transceiver 100.

Figure 3:
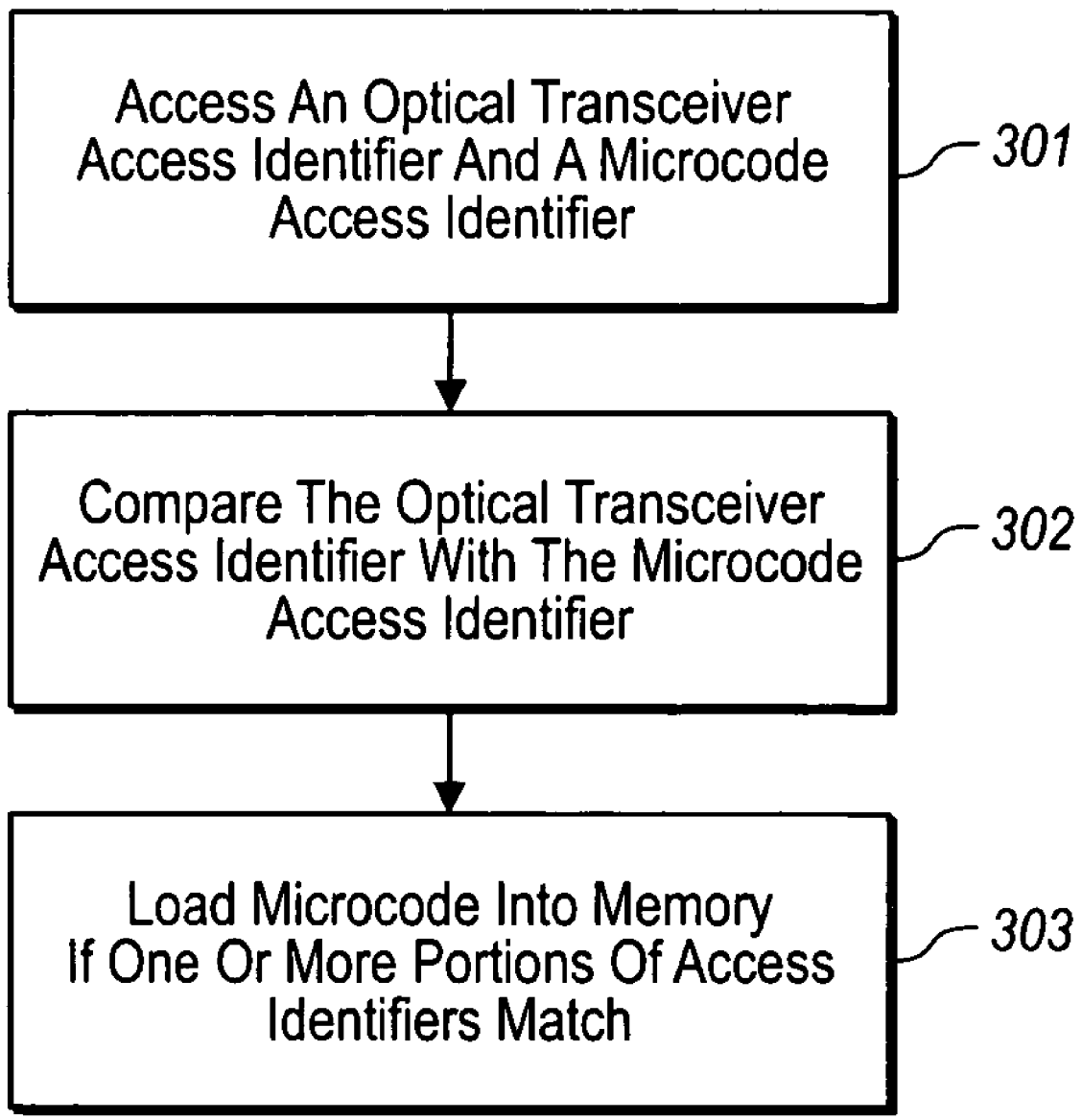
FIG. 3 illustrates a flowchart of a method for verifying that an optical transceiver has access privileges to received microcode in accordance with the principles of the present invention.

Referring to FIG. 3, a flowchart of a method 300 for verifying that an optical transceiver has access privileges to received microcode is illustrated with respect to the environment of FIGS. 1 and 2. Note that the environment of FIGS. 1 and 2 are only one of countless environments in which method 300 may be practiced and should not be used to limit the scope of the appended claims.

Method 300 includes an act of accessing an optical transceiver access identifier and a microcode access identifier (act 301). For example, the processors 203 may access optical transceiver access identifier 106B and microcode access identifier 122 upon receiving microcode 121. As mentioned previously, the access identifier 106B and 122 may include any number of identifying information about transceiver 100 such as, but not limited to, serial number, date of manufacture, customer, etc. In an alternative embodiment, host 111 may access the access identifiers 106B and 122 upon receiving microcode 122.

Method 300 also includes an act of comparing the optical transceiver access identifier with the microcode access identifier (act 302). For example, processors 203 or some other component of transceiver 100 may compare optical transceiver access identifier 106B and microcode access identifier 122. In some embodiments, this comparison is caused by the execution of verification microcode 106C that is resident in the transceiver loader module 106A. Alternatively, host 111 may perform the act of comparing the access identifiers 106B and 122.

Method 300 further includes, based on the comparison of act 302, an act of loading received microcode into memory if one or more portions of optical transceiver access identifier 106B and microcode access identifiers 122 match (act 303). For example, if processors 203 find that both access identifiers 106B and 122 include matching data such as a serial number or any other type of data previously mentioned, then the processors will load the received microcode to either controller system memory 206 for immediate execution or persistent memory 106 for later execution. Alternatively, the host 111 may load the received microcode into either controller system memory 206 for immediate execution or persistent memory 106 for later execution if data matched in the access identifiers 106B and 122. In any case, if there is no match found, then the received microcode will not be loaded for execution.

A specific example of the present invention will now be described. Note that this specific example is for illustrative purposes only and should not be used to limit the scope of the appended claims. Suppose that a particular user or customer implemented a host 111 containing three transceivers of the same structure as transceiver 100, two of which are 4 GHz Fibre channel transceivers and a third which is a 4 GHz Ethernet transceiver. Further, suppose that the transceivers 100 were provided by the manufacturer with an optical transceiver access identifier that included a serial number unique to each transceiver, a customer number for the user of all three transceivers, and a protocol and speed identifier for each transceiver.

Now suppose that a user desired to update different microcode sets in each of the three different transceivers. The microcode sets would be provided to the transceivers as previously discussed. One microcode set could include a microcode access identifier that contained the customer number. The processors 203 in each of the transceivers, upon receiving the first microcode set, would access their transceiver access identifiers and the microcode identifier and compare them. Since the access identifiers in all three transceivers include the customer number (as all three transceivers are owned by the same user), all three transceivers would be given access to this first microcode set. The microcode set would then be loaded into each transceiver's persistent memory 106 for later execution.

Suppose that a second microcode set was only intended for the first 4 Ghz Fibre channel transceiver. This second microcode set would include a microcode access identifier including the serial number of the first 4 Ghz Fibre channel transceiver. All three transceivers, upon receiving the second microcode set, would access their transceiver access identifiers and the microcode identifier and compare them. However, only the first 4 GHz Fibre channel transceiver would find a match (the serial number), and thus determine that it was privileged to the second microcode set, which would then be loaded into persistent memory 106 for later execution. The other two transceivers would determine they were not privileged to the microcode set as there was no match and would not load or execute the microcode set.

Suppose that a third microcode set was only intended for the two 4 GHz Fibre channel transceivers. This third microcode set would include a microcode access identifier including speed and protocol of the 4 Ghz Fibre channel transceivers All three transceivers, upon receiving the third microcode set, would access their transceiver access identifiers and the microcode identifier and compare them. However, only the two 4 GHz Fibre channel transceivers would find a match (the speed and protocol identifier), and thus determine that they were privileged to the microcode set, which would then be loaded into persistent memory 106 for later execution. The 4 GHz Ethernet transceiver would determine it was not privileged to the microcode set as there was no match and would not load or execute the microcode set.

Accordingly, the principles of the present invention relate to an optical transceiver configured to include a microcode access key. The access key is structured to include a transceiver access identifier. The access key, when processed, causes the optical transceiver to read the access identifier when new microcode is received. The transceiver uses the access identifier to determine that it has access privilege to the received microcode. The access key helps to ensure that improper update microcode is not loaded or executed by the optical transceiver, thus helping to protect the optical transceiver from operational failure or damage to transceiver hardware. Accordingly, the principles of the present invention are a significant advancement in the art of optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an environment that includes an optical transceiver communicatively coupled to a host computing system, wherein the optical transceiver includes a processor and a memory having thereon an optical transceiver access identifier, the memory configured to receive microcode that includes a microcode access identifier, a method for verifying that the optical transceiver has access privileges when receiving microcode, the method comprising;

an act of accessing an optical transceiver access identifier and a microcode access identifier;

an act of comparing the optical transceiver access identifier and the microcode access identifier; and based on the comparison, an act of loading received microcode into the memory if one or more portions of the optical transceiver access identifier and the microcode access identifier match.

2. A method in accordance with claim 1, wherein the optical transceiver access identifier includes at least one of a serial number, part number, model number, lot number, module family, current firmware version, the date manufactured, customer name, customer part number, and protocol and speed.

3. A method in accordance with claim 1, wherein the microcode access identifier includes at least one of a serial number, part number, model number, lot number, module family, current firmware version, the date manufactured, customer name, customer part number, and protocol and speed.

4. A method in accordance with claim 1, wherein the acts of accessing, comparing and loading are performed by the processor.

5. A method in accordance with claim 1, wherein the acts of accessing, comparing and loading are performed by the host computing system.

6. A method in accordance with claim 4, further wherein the execution of verification microcode causes the processor to perform the act of comparing.

7. A method in accordance claim 1, wherein the microcode loaded into the memory is executed by the processor.

8. An optical transceiver comprising:

at least one processor;

a memory that is configured to include an optical transceiver access identifier and is configured to receive microcode that includes a microcode access identifier, the memory further including verification microcode including processor-executable instructions that, when executed by the at least one processor, causes the optical transceiver to perform the following when the optical transceiver receives microcode:

an act of accessing an optical transceiver access identifier and a microcode access identifier;

an act of comparing the optical transceiver access identifier and the microcode access identifier; and based on the comparison, an act of loading received microcode into the memory if one or more portions of the optical transceiver access identifier and the microcode access identifier match.

9. An optical transceiver in accordance with claim 8, wherein the optical transceiver access identifier includes at least one of a serial number, part number, model number, lot number, module family, current firmware version, the date manufactured, customer name, customer part number, and protocol and speed.

10. An optical transceiver in accordance with claim 8, wherein the microcode access identifier includes at least one of a serial number, part number, model number, lot number, module family, current firmware version, the date manufactured, customer name, customer part number, and protocol and speed.

11. An optical transceiver in accordance with claim 8, wherein the acts of accessing, comparing and loading are performed by the processor.

12. An optical transceiver in accordance with claim 8, wherein the microcode is received from a host computing system.

13. An optical transceiver in accordance with claim 8, wherein the microcode loaded into the memory is executed by the processor.

14. An optical receiver comprising:

at least one processor;

a memory that is configured to include an optical transceiver access identifier and is configured to receive microcode that includes a microcode access identifier, the memory further including verification microcode including processor-executable instructions that, when executed by the at least one processor, causes the optical transceiver to perform the following when the optical transceiver receives microcode:

an act of accessing an optical transceiver access identifier and a microcode access identifier;

an act of comparing the optical transceiver access identifier and the microcode access identifier; and based on the comparison, an act of loading received microcode into the memory if one or more portions of the optical transceiver access identifier and the microcode access identifier match.

15. An optical receiver in accordance with claim 14, wherein the optical transceiver access identifier includes at least one of a serial number, part number, model number, lot number, module family, current firmware version, the date manufactured, customer name, customer part number, and protocol and speed.

16. An optical receiver in accordance with claim 14, wherein the microcode access identifier includes at least one of a serial number, part number, model number, lot number, module family, current firmware version, the date manufactured, customer name, customer part number, and protocol and speed.

17. An optical receiver in accordance with claim 14, wherein the acts of accessing, comparing and loading are performed by the processor.

18. An optical receiver in accordance with claim 14, wherein the microcode is received from a host computing system.

19. An optical receiver in accordance with claim 14, wherein the microcode loaded into the memory is executed by the processor.

* * * * *